United States Patent [19]
Pedersen et al.

[11] Patent Number: 5,442,778
[45] Date of Patent: Aug. 15, 1995

[54] SCATTER-GATHER: A CLUSTER-BASED METHOD AND APPARATUS FOR BROWSING LARGE DOCUMENT COLLECTIONS

[75] Inventors: Jan. O. Pedersen, Palo Alto; David Karger, Stanford; Douglass R. Cutting, Menlo Park, all of Calif.; John W. Tukey, Princeton, N.J.

[73] Assignee: Xerox Corporation, Stamford, Conn.

[21] Appl. No.: 790,316

[22] Filed: Nov. 12, 1991

[51] Int. Cl.⁶ ............................................. G06F 17/30
[52] U.S. Cl. .............................. 395/600; 364/419.19; 364/419.13; 364/225.6; 364/DIG. 1
[58] Field of Search .................. 395/600, 144; 382/39; 340/146.2; 364/419.19, 419.13

[56] References Cited

U.S. PATENT DOCUMENTS

| | | | |
|---|---|---|---|
| 3,568,155 | 3/1971 | Abraham et al. | 395/600 |
| 4,053,871 | 10/1977 | Vidalin et al. | 340/146.2 |
| 4,575,798 | 3/1986 | Lindstrom et al. | 395/600 |
| 4,774,655 | 9/1988 | Kollin et al. | 395/600 |
| 4,774,657 | 9/1988 | Anderson et al. | 395/600 |
| 4,956,774 | 9/1990 | Shibamiya et al. | 395/600 |
| 4,972,349 | 11/1990 | Kleinberger | 395/144 |
| 5,075,896 | 12/1991 | Wilcox et al. | 382/39 |
| 5,168,565 | 12/1992 | Morita | 395/600 |
| 5,257,365 | 10/1993 | Powers et al. | 395/600 |
| 5,278,980 | 1/1994 | Pederson et al. | 395/600 |

OTHER PUBLICATIONS van Rijsbergen, Information Retrieval, second edition, 1979, pp. 1-65, 184-191.

Crouch, C. J., "A Cluster-based Approach to Thesaurus Construction", ACM SIGIR 11th International Conference on Research & Development in Information Retrieval, pp. 309-320, Jun. 15, 1988.

"Information Theater Could Overthrow Traditional Information Refiners"; D. Coursey, MIS Week Jun. 25, 1990.

"Information Theater Versus Information Refinery"; D. Cutting et al (Xerox). Mar. 27, 1990 Stanford University.

"Understanding Multi-Articled Documents" Tsujimoto et al.; Jun. 1990; Proc. 10th International Conference of Pattern Recognition.

"Recent Trends in Hierarchic Document Clustering: A Critical Review"; P. Willett; Information Processing & Management, vol. 24, No. 5, pp. 577-597, 1988, Permagon Press, Inc.

Primary Examiner—Thomas G. Black
Assistant Examiner—Larry J. Ellcessor
Attorney, Agent, or Firm—Oliff & Berridge

[57] ABSTRACT

Scatter-Gather is a computer based document browsing method which operates in time proportional to a number of documents in a target corpus. The Scatter-Gather method includes: preparing an initial ordering of the corpus using, for example, an off-line computational method; determining a summary of the initial ordering of the corpus for interactive utility; and providing a further ordering of the corpus using, for example, an on-line non-deterministic method. The step of an off-line preparation of an initial ordering of a corpus is non-time-dependent, thus an accurate initial ordering is prepared. The step of determining a summary includes determining a summary for presentation to a user without scrolling on a CRT. The step of providing a further ordering includes truncated group average agglomerate clustering, merging disjointed document sets, center finding, assign-to-nearest and other refinement methods.

21 Claims, 5 Drawing Sheets

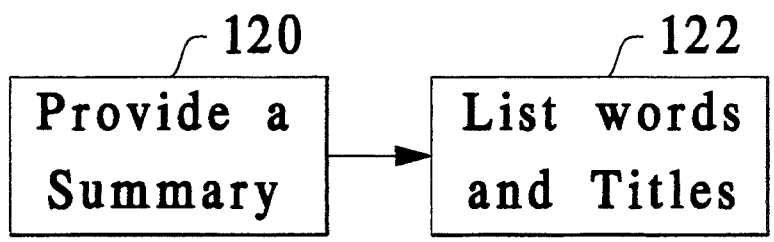
Fig. 5
Fig. 6
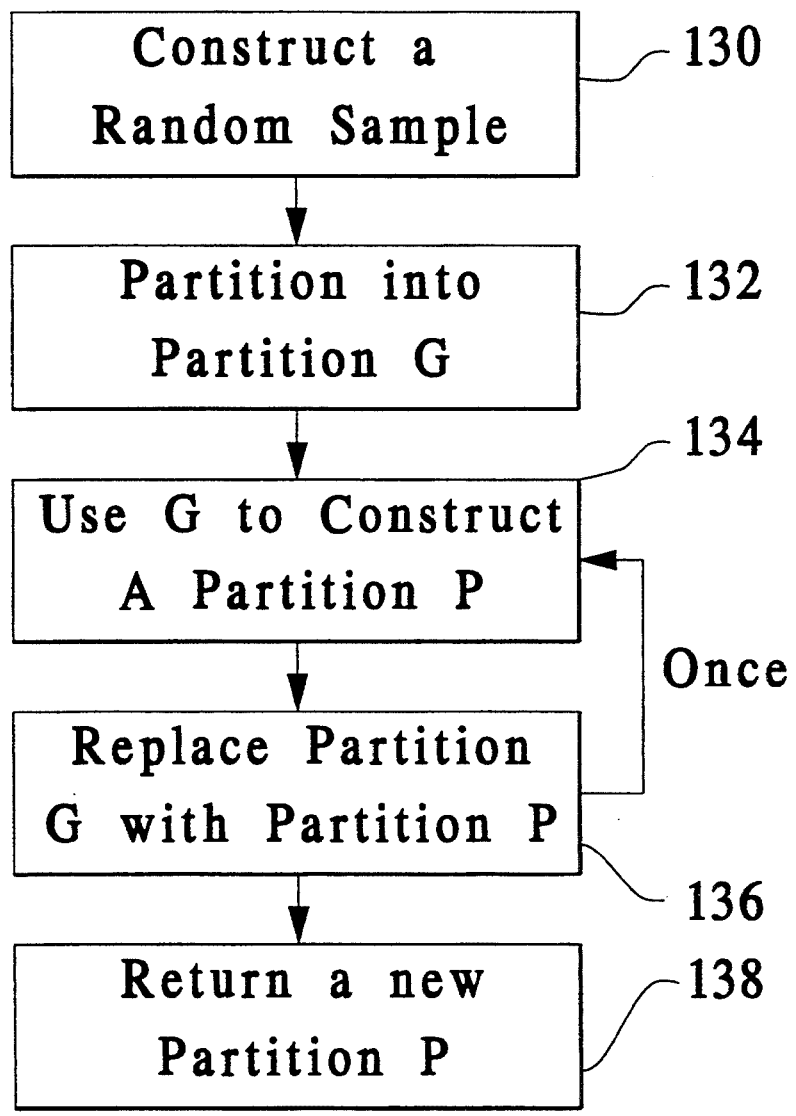

SCATTER-GATHER: A CLUSTER-BASED METHOD AND APPARATUS FOR BROWSING LARGE DOCUMENT COLLECTIONS

BACKGROUND OF THE INVENTION

The present invention relates to a document-clustering-based browsing procedure for a corpus of documents, which is applicable over all natural languages that contain a lexical analysis capability.

Document clustering has been extensively investigated as methodology for improving document search and retrieval. The general assumption is that mutually similar documents will tend to be relevant to the same queries and hence, automatic determination of groups of such documents can improve recall by effectively broadening a search request. Typically a fixed corpus of documents is clustered either into an exhaustive partition, disjoint or otherwise, or into an hierarchical tree structure. In the case of a partition, queries are matched against clusters, and the contents of some number of the best scoring clusters are returned as a result, possibly sorted by score. In the case of a hierarchy, queries are processed downward, always taking the highest scoring branch, until some stopping condition is achieved. The subtree at that point is then returned as a result.

Hybrid strategies are also available, which are essentially variations of near-neighbor search, where nearness is defined in terms of the pairwise document similarity measure used to generate the clustering. Indeed, cluster search techniques are typically compared to similarity search, a direct near-neighbor search, and are evaluated in terms of precision and recall. Various studies have indicated that cluster search strategies are not markedly superior to similarity search and, in some situations, can be inferior. It is therefore not surprising that cluster search, given its indifferent performance, and the high determinable cost of clustering large corpora, has not gained wide popularity.

Document clustering has also been studied as a method for accelerating similarity search, but the development of fast procedures for near-neighbor searching has decreased interest in that possibility.

In order to cluster documents, one must first establish a pairwise measure of document similarity and then define a method for using that measure to form sets of similar documents, or clusters. Numerous document similarity measures have been proposed, all of which consider the degree of word overlap between the two documents of interest, described as sets of words, often with frequency information. These sets are typically represented as sparse vectors of length equal to the number of unique words (or types) in the corpus. If a word occurs in a document, its location in this vector is occupied by some positive value (one if only presence/absence information is considered, or some function of its frequency within that document if frequency is considered). If a word does not occur in a document, its location in this vector is occupied by zero. A popular similarity measure, the cosine measure, determines the cosine of the angle between these two sparse vectors. If both document vectors are normalized to unit length, this is of course, simply the inner product of the two vectors. Other measures include the Dice and Jaccard coefficient, which are normalized word overlap counts. It has also been suggested that the choice of similarity measure has less qualitative impact on clustering results than the choice of clustering procedure.

A wide range of clustering procedures have been applied to documents including, most prominently, single-linkage hierarchical clustering. Hierarchical clustering procedures proceed by iteratively considering all pairs of similarities, and fusing the pair which exhibits the greatest similarity. They differ in the procedure used to determine similarity when one of the pairs is a document group, i.e., the product of a previous fusion. Single-linkage clustering defines the similarity as the maximum similarity between any two individuals, one from each half of the pair. Alternative methods consider the minimum similarity (complete linkage), the average similarity (group average linkage), as well as other aggregate measures. Although single-linkage clustering is known to have an unfortunate chaining behavior, typically forming elongated straggly clusters, it continues to be popular due to its simplicity, and the availability of an optimal space/time procedure for its determination.

Standard hierarchical document clustering techniques employ a document similarity measure and consider the similarities of all pairs of documents in a given corpus. Typically, the most similar pair is fused and the process iterated, after suitably extending the similarity measure to operate on agglomerations of documents as well as individual documents. The final output is a binary tree structure that records the nested sequence of pairwise joints. Traditionally, the resulting trees had been used to improve the efficiency of standard boolean or relevance searches by grouping together similar documents for rapid access. The resulting trees have also lead to the notion of cluster search in which a query is matched directly against nodes in the cluster tree and the best matching subtree is returned. Counting all pairs, the cost of constructing the cluster trees can be no less than proportional to $N^2$, where N is the number of documents in the corpus. Although clustering experiments have been conducted on corpora with documents numbering in the low tens of thousands, the intrinsic order of these clustering procedures works against the expectation that corpora will continue to increase in size. Similarly, although cluster searching has shown some promising results, the method tends to favor the most determinationally expensive similarity measures and seldom yields greatly increased performance over other standard methods.

Hierarchical methods are intrinsically quadratic in the number of documents to be clustered, because all pairs of similarities must be considered. This sharply limits their usefulness, even given procedures that attain this theoretical upper bound on performance. Partitional strategies (those that strive for a flat decomposition of the collection into sets of documents rather than a hierarchy of nested partitions) by contrast are typically rectangular in the size of the partition and the number of documents to be clustered. Generally, these procedures proceed by choosing in some manner, a number of seeds equal to the desired size (number of sets) of the final partition. Each document in the collection is then assigned to the closest seed. As a refinement the procedure can be iterated with, at each stage, a hopefully improved selection of cluster seeds. However, to be useful for cluster search the partition must be fairly fine, since it is desirable for each set to only contain a few documents. For example, a partition can be generated whose size is related to the number of unique words in the document collection. From this perspective, the potential determinable benefits of a partitional strategy are largely obviated by the large size (relative to the number of documents) of the required partition. For this reason partitional strategies have not been aggressively pursued by the information retrieval community.

The standard formulation of cluster search presumes a query, the user's expression of an information need. The task is then to search the collection of documents that match this need. However, it is not difficult to imagine a situation in which it is hard, if not impossible to formulate such a query. For example, the user may not be familiar with the vocabulary appropriate for describing a topic of interest, or may not wish to commit himself to a particular choice of words. Indeed, the user may not be looking for anything specific at all, but rather may wish to gain an appreciation for the general information content of the collection. It seems appropriate to describe this as browsing rather than search, since it is at one extreme of a spectrum of possible information access situations, ranging from requests for specific documents to broad, open-ended questions with a variety of possible answers. Standard information access techniques tend to emphasize search. This is especially clearly seen in cluster search where a technology capable of topic extraction, i.e., clustering, is submerged from view and used only as an assist for near-neighbor searching.

In proposing an alternative application for clustering in information access we take our inspiration from the access methods typically provided with a conventional text book. If one has a specific question in mind, and specific terms which define that question, one consults an index, which directs one to passages of interest, keyed by search words. However, if one is simply interested in gaining an overview, one can turn to the table of contents which lays out the logical structure of the text for perusal. The table of contents gives one a sense of the types of questions that might be answered if a more intensive examination of the text were attempted, and may also lead to specific sections of interest. One can easily alternate between browsing the table of contents, and searching the index.

By direct analogy, an information access system is proposed herein, which can have, for example, two components: a browsing tool which uses a cluster-based, dynamic table-of-contents metaphor for navigating a collection of documents; and one or more word-based, directed text search tools, such as similarity search, or the search technique described in U.S. patent application Ser. No. 07/745,794 to Jan O. Pedersen et al filed Aug. 16, 1991, and entitled An Iterative Technique For Phrase Query Formation and an Information Retrieval System Employing Same. The browsing tool describes groups of similar documents, one or more of which can be selected for further refinement. This selection/refinement process can be iterated until the user is directly viewing individual documents. Based on documents found in this process, or on terms used to describe document groups, the user may at any time switch to a more focused search method. In particular it is anticipated that the browsing tool will not necessarily be used to find particular documents, but may instead assist the user in formulating a search request, which will then be evaluated by some other means.

U.S. Pat. No. 4,956,774 to Shibamiya et al. discloses a method for selecting an access path in a relational database management system having at least one index. The first step is to select a number of most frequently occurring values of at least part of a key of the index. The number is greater than zero and less than the total number of such values. Statistics on the frequency of occurrence of the selected values are collected. An estimate of the time required to use the index as the access path is made, based at least in part on the index's most frequently occurring values statistics. The estimate is used as the basis at least in part for selecting an access path for the query. The database optimizer described is hierarchically organized in order of word frequency.

"Recent trends in hierarchic document clustering: A critical review" by Peter Willett, Information Processing of Management, Vol. 24, No. 5, pages 577-97 (1988—printed in Great Britain) describes the calculation of interdocument similarities and clustering methods that are appropriate for document clustering. The article further discusses procedures that can be used to allow the implementation of the aforementioned methods on databases of nontrivial size. The validation of document hierarchies is described using tests based on the theory of random graphs and on empirical characteristics of document collections that are to be clustered. A range of search strategies is available for retrieval from document hierarchies and the results are presented in a series of research projects that have used these strategies to search a cluster resulting from several different types of hierarchic agglomerative clustering methods. The article suggests that a complete linkage method is probably the most effective method in terms of retrieval performance; however, it is also difficult to implement in an efficient manner. Other applications of document clustering techniques are discussed briefly; experimental evidence suggests that nearest neighbor clusters, possibly represented as a network model, provide a reasonably efficient and effective means of including interdocument similarity information in document retrieval systems.

"Understanding Multi-Articled Documents" by Tsujimoto et al., presented in June 1990 in Atlantic City, N.J. at the 10th International Conference for Pattern Recognition, describes an attempt to build a method to understand document layouts without the assistance of character recognition results, i.e., the meaning of contents. It is shown that documents have an obvious hierarchical structure in their geometry which is represented by a tree. A small number of rules are introduced to transform the geometric structure into the logical structure which represents the semantics carried by the documents. A virtual field separator technique is employed to utilize information carried by a special constituent of documents such as field separators and frames, keeping the number of transformation rules small.

SUMMARY OF THE INVENTION

In the basic iteration of the proposed Scatter-Gather browsing tool, which can be defined as a method and apparatus for browsing large document collections, the user is presented with the descriptions (or summaries) of a fixed number of document groups. Based on these summaries, the user selects one or more of these groups for further study. These selected groups are gathered together to form a subcollection. The system then scatters (or reclusters) the new subcollection into the same fixed number of document groups, which are again presented to the user. With each successive iteration, since the number of documents decreases through selection while the number of groups remains fixed, the groups become smaller and therefore more detailed. Ultimately, when the groups become small enough, this process bottoms out by viewing individual documents. A history mechanism allows the user to backup from the results of an iteration, to either try a different selection or to backup further.

Scatter-Gather depends on the existence of two facilities. First, since clustering and reclustering is an essential part of the basic iteration, there is clearly a requirement for a procedure which can cluster a large number of documents within a time tolerable for user interaction (typically no more than about 60 seconds). For this strategy to scale with corpus size, some provision must also be made for dealing with corpora larger than can be clustered within this time allowance. Second, given a group of documents, some method for automatically summarizing the group must be specified. This cluster description must be sufficiently revealing for a user to gain a sense of the topic defined by the group, yet short enough for many descriptions to be appreciated simultaneously.

Three procedures are disclosed which can be used together to satisfy the above requirements, or used separately to enhance other corpus partitioning and/or searching techniques. A first procedure, Buckshot is a very fast partition-type clustering method suitable for an online reclustering preferable for Scatter-Gather. The Buckshot procedure employs three subprocedures. The first subprocedure is truncated group average agglomerative clustering which merges disjoint document sets, or groups, starting with individuals, until only a predetermined number of groups remain. At each step the two groups whose merger would produce the greatest average similarity are merged into a single new group. The second subprocedure determines a trimmed sum profile from selected documents closest to a document group centroid. The third subprocedure assigns individual documents to the closest center represented by one of the trimmed average profiles.

A second procedure, Fractionation, is another more precise, partition-type clustering method suitable for a static off-line partitioning of the entire corpus which can be presented first to the user. Fractionation can be thought of as a more careful version of Buckshot that trades speed for increased accuracy. In particular, the random sampling of a corpus of documents and the partitioning of the random sample by truncated group average agglomerative clustering (as provided in the Buckshot procedure), are replaced by a deterministic center finding subprocedure (for Fractionation). Fractionation also provides additional refinement iterations and procedures. Specifically, Fractionation provides initial partitioning of a corpus of documents using a deterministic center finding subprocedure. Then, by applying an Assign-to-Nearest subprocedure, a partition of a desired size is determined. Finally, the partitioning is refined through iterative refinement subprocedures.

A third procedure, Cluster Digest is a cluster summarization suitable as a cluster display method in Scatter-Gather. For Scatter-Gather, it is desirable for a summary to be constant in size, so a fixed number of summaries can be reliably fit onto a given display area. The Cluster Digest summary lists a fixed member of topical words plus the document titles of a few typical documents, where topical words are those that often occur in a cluster, and typical documents are those close to the cluster centroid (or trimmed centroid).

BRIEF DESCRIPTION OF THE DRAWINGS

The invention will be described in detail with reference to the following drawings in which line reference numerals refer to like elements.

FIG. 5 is a high level flowchart, according to the present invention, of an embodiment of a Cluster Digest method for determining a summary of an ordering of a corpus of documents in the Scatter-Gather document browsing method.

FIG. 6 is an intermediate level flowchart, according to the present invention, of a preferred embodiment of a Buckshot method for providing a further, preferably on-line, ordering of a corpus of documents in the Scatter-Gather browsing method.

DETAILED DESCRIPTION OF THE PREFERRED EMBODIMENT

A. Overview

Figure 1:
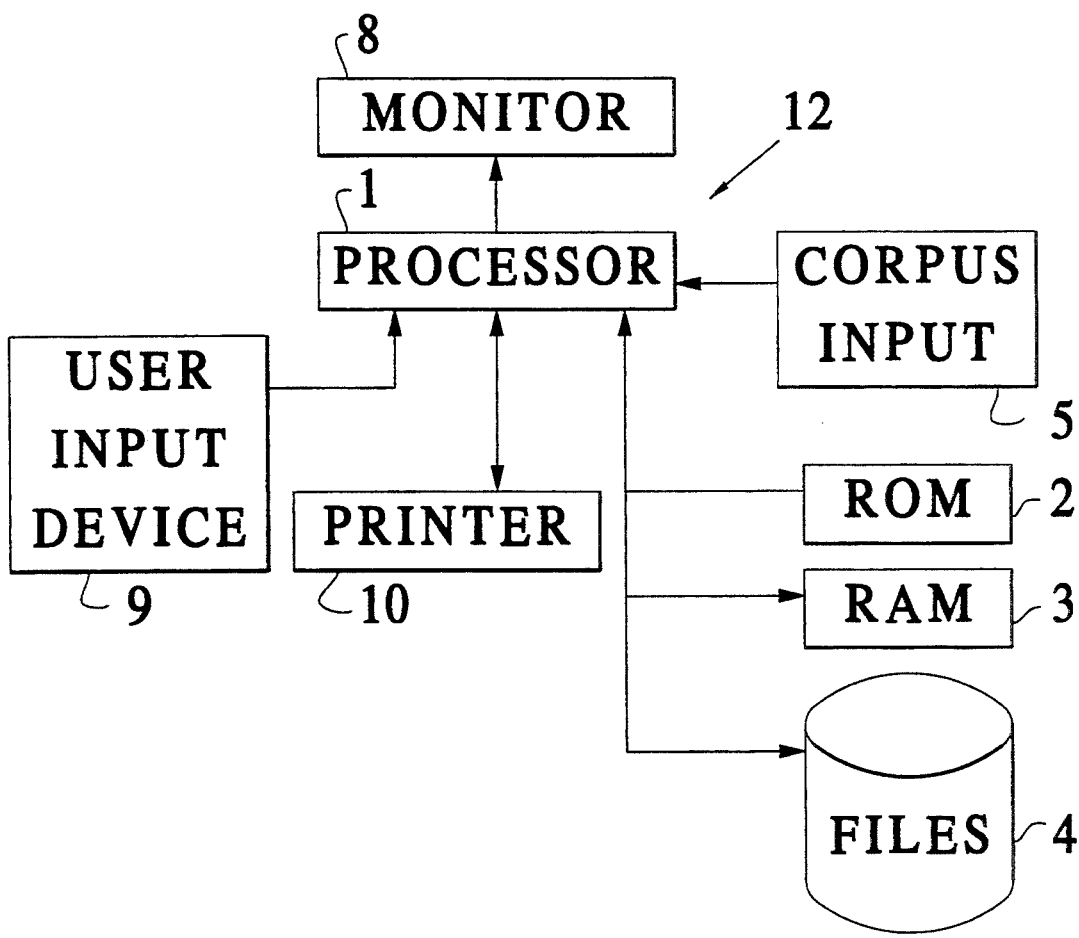
FIG. 1 is a block diagram of the hardware components used to practice the present invention.

The present invention can be implemented in a document corpus browsing system 12 as illustrated by block diagram in FIG. 1. The system includes a central processing unit (microprocessor) 1 for receiving signals from, and outputting signals to various other components of the system, according to one or more programs run on microprocessor 1. The system includes a read only memory (ROM) 2 for storing operating programs. A random access memory (RAM) 3 is provided for running the various operating programs, and additional files 4 could be provided for overflow and the storage of partitioned corpora used by the present invention in performing a search operation.

Prior to performing a browsing procedure, a document corpus is input from a corpus input 5. The corpus is then partitioned by software controlling processor 1 according to the teachings of the present invention.

Monitor 8 is provided for displaying results of partitioning procedures, and for permitting the user to interface with the operating programs. A user input device 9 such as, for example, a mouse, a keyboard, a touch screen or combinations thereof is provided for input of commands by the operator. A printer 10 can also be provided so that hard copies of documents, as well as print-outs containing Cluster Digest summaries, can be printed.

The system 12 is based in a digital computer which can implement an off-line preparation of an initial ordering using, for example, the Fractionation method disclosed herein. The system 12 also determines a summary of the initial ordering of the corpus which can be displayed to user via monitor 8 or printer 10 for user interaction. This summary can be determined by, for example, using the Cluster Digest method disclosed herein. After receiving appropriate instructions from a user via user input device 9, system 12 can perform a further ordering of the corpus using, for example, the on-line Buckshot method described herein.

Figure 3:
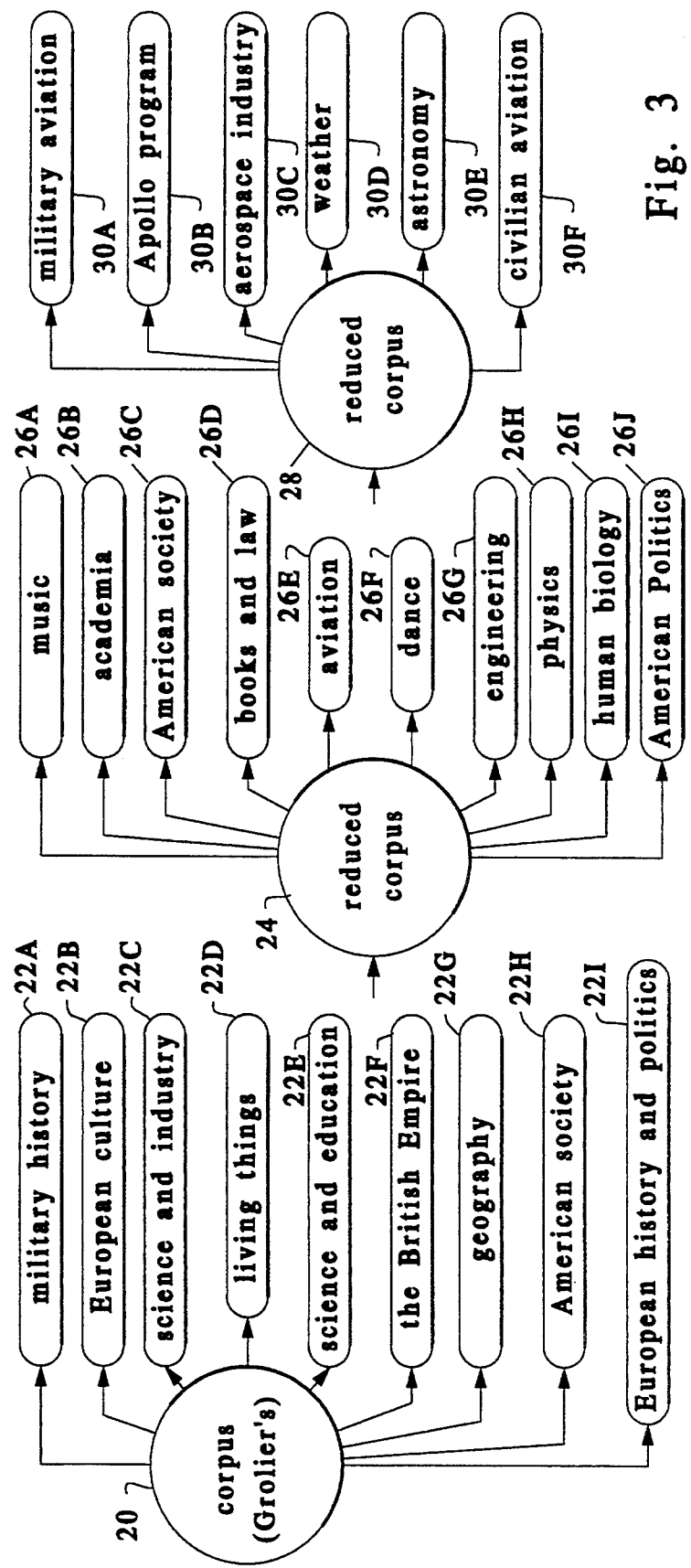
FIG. 3 is an illustrative diagram of a preferred embodiment of the Scatter-Gather document browsing method of the present invention being applied to a corpus of documents consisting of Grolier's Encyclopedia.

An illustration of Scatter-Gather in operation is shown in FIG. 3. Here the text collection 20 is an on-line-version of Grolier's encyclopedia (roughly 64 Megabytes of ASCII text) with each of the twenty-seven thousand articles treated as a separate document. Suppose the user is interested in investigating the role of women in the exploration of space. Rather than attempting to express this information need as a formal query, the user instead selects a number of the top-level clusters referenced as 22A–I that, from their description, seem relevant to the topic of interest. In this case, the user selects the clusters 22A, 22C and 22H labelled "military history", "science and industry", and "American society" to form a reduced corpus 24 of the indicated subset of articles from Grolier's. (Note, the cluster labels are idealized in this illustration; the actual implementation produces cluster descriptions which are longer than would fit conveniently in this figure. However, the given labels are reasonable glosses of topics described by actual cluster summaries).

The reduced corpus is then reclustered on the fly to produce a new set of clusters 26A–J covering the reduced corpus 24. Since the reduced corpus contains a subset of the articles in Grolier's, these new clusters are at a finer level of detail than the top-level clusters. The user again selects clusters of interest. In this case, these include clusters 26E, 26G and 26H labeled "aviation", "engineering", and "physics". Again, a further reduced corpus 28 is formed and reclustered. The final set of clusters 30A–F includes clusters labeled for "military aviation", "Apollo program", "aerospace industry", "weather", "astronomy" and "civil aviation". At this stage the clusters are small enough for direct perusal via an exhaustive list of article titles. Assuming at least one article of interest is found, the user may find more articles of a similar nature in the same cluster, or may use a directed search method, based on the vocabulary of the found article or of the cluster description, to find additional articles.

Figure 2:
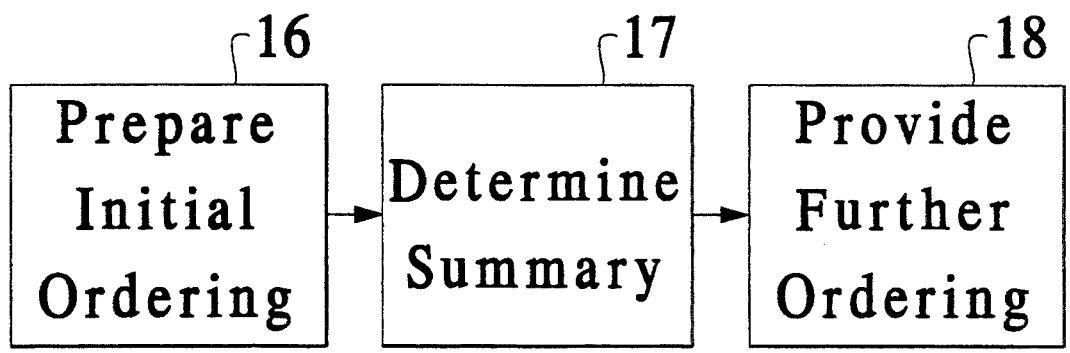
FIG. 2 is a high level flowchart of a preferred embodiment of the Scatter-Gather document browsing method according to the present invention.

The Scatter-Gather browsing technique can be demonstrated in more detail through the following sample session performed with a prototype implementation. The basic steps are illustrated in FIG. 2, with the output data (output via a monitor or printer) being illustrated below. The corpus is still Grolier's encyclopedia and the goal is to find documents discussing space explorers. To create the initial partition (Step 16), the Buckshot clustering method is first applied. Fractionation could also be used for this task, time permitting.

```
> (setq first (time (outline (all-docs tdb))))
cluster 27581 items
global cluster 525 items ...
cluster sizes 38 29 45 42 41 46 26 124 115 19
assign to nearest ... done
cluster sizes 1838 1987 3318 2844 2578 2026 1568 4511 5730 1181
assign to nearest ... done
cluster sizes 1532 2206 3486 2459 2328 2059 1609 4174 6440 1288
   Cluster 0: Size: 1532. Focus articles: American music, music, history of; Ita
      focus terms: music, opus, composer, century, musical, play, dance, style, i
   Cluster 1: Size: 2206. Focus articles: Christianity; Germany, history o; church
      focus terms:church, king, roman, son, war, century, christian, emperor, jo
   Cluster 2: Size: 3486. Focus articles: French literature; English literature;
      focus terms:novel, trans, play, eng, writer, life, poet, american, poem, s
   Cluster 3: Size: 2459. Focus articles: education; university; graduate educate
      focus terms:university, study, school, state, american, theory, college, s
   Cluster 4: Size: 2328. Focus articles: plant; fossil record; mammal; growth; o
      focus terms:water, year, cell, area, animal, body, disease, human, develop
   Cluster 5: Size: 2059. Focus articles: bird; shorebirds; flower; viburnum; cac
      focus terms:specie, family, plant, flower, grow, genus, tree, leaf, white,
   Cluster 6: Size: 1609. Focus articles: radio astronomy; space exploration; sta
      focus terms:tight, star, earth, space, energy, surface, motion, line, fiel
   Cluster 7: Size: 4174. Focus articles: Latin American art; art; American art a
      focus terms:city, century, art, plant, build, center, style, bc, museum, d
   Cluster 8: Size: 6440. Focus articles: United States, his; United States; Euro
      focus terms; state, war, unite, year, government, world, american, area, ri
   Cluster 9: Size: 1288. Focus articles: chemistry, history; organic chemistry;
      focus terms:chemical, element, compound, metal, numb, atom, water, process
real time 465953 msec
```

Each cluster is described with a two line display, via an application of Cluster Digest (Step 17). Clusters 6 (Astronomy), 8 (U.S. History) and 9 (Chemistry) are picked, as those which seem likely to contain articles of interest, Recluster (Step 18), and Display.

```
> time (setq second (outline first 6 8 9)))
cluster 9337 items
global cluster 305 items ...
cluster sizes 23 11 19 31 18 57 38 48 21 39
assign to nearest ... done
cluster sizes 706 298 679 630 709 1992 980 1611 1159 573
assign to nearest ... done
cluster sizes 538 315 680 433 761 1888 1376 1566 1068 712
   Cluster 0: Size: 538. Focus articles: Liberal parties; political parties; Lab
      focus terms:party, minister, government, prime, leader, war, state, politi
   Cluster 1: Size: 315. Focus articles: star; astronomy and astr; extragalactic
      focus terms:star, sun, galaxy, year, earth, distance, light, astronomer, m
```

-continued

Cluster 2: Size: 680. Focus articles: television; glass; aluminum; sound reco
    focus terms:process, metal, material, tight, type, mineral, color, device,
Cluster 3: Size: 433. Focus articles: Laccadive Islands; French Southern an;
    focus terms:island, sq, area, population, south, west, state, coast, north
Cluster 4: Size: 761. Focus articles: organic chemistry; chemistry, history;
    focus terms:chemical, element, compound, numb, atom, acid, reaction, water
Cluster 5: Size: 1888. Focus articles: United States, his; Europe, history of;
    focus terms:war, state, world, unite, american, british, army, government,
Cluster 6: Size: 1376. Focus articles: president of the U; Democratic party; b
    focus terms:state, president, law, court, year, unite, right, american, wa
Cluster 7: Size: 1566. Focus articles: United States; North America; Australia
    focus terms:state, river, area, population, north, south, year, west, regi
Cluster 8: Size: 1068. Focus articles: space exploration; radio astronomy; ele
    focus terms;energy, space, light, earth, particle, field, theory, motion,
Cluster 9: Size: 712. Focus articles: corporation; monopoly and compe; govern
    focus terms:company, state, unite, product, billion, year, service, sale,
real time 186338 msec Iteration occurs, this time selecting clusters 1 (Astronomy) and 8 (Space Exploration and Astronomy).

Space exploration is well separated from Astronomy in cluster 7, thus Space Exploration is picked by the operator.

```
> (time (setq third (outline second 1 8)))
cluster 1383 items
global cluster 117 items . . .
cluster sizes 12 4 8 15 12 7 8 22 9 20
move to nearest . . . done
cluster sizes 172 63 70 236 76 131 75 198 124 238
move to nearest . . . done
cluster sizes 176 83 86 205 86 134 84 187 132 210
```
Cluster 0: Size: 176. Focus articles: thermodynamics; light; energy; optics;
    focus terms:energy, heat, light, temperature, gas, wave, motion, air, pres
Cluster 1: Size: 83. Focus articles: analytic geometry; line; geometry; coor
    focus terms:point, line, plane, angle, circle, geometry, coordinate, curve
Cluster 2: Size: 86. Focus articles: radio astronomy; observatory, astro; te
    focus terms:telescope, observatory, radio, instrument, astronomy, light, s
Cluster 3: Size: 205. Focus articles: solar system; Moon; planets; astronomy,
    focus terms:earth, sun, solar, planet, moon, satellite, orbit, surface, ye
Cluster 4: Size: 86. Focus articles: radio, magnetism; circuit, electric; ge
    focus terms:field, frequency, magnetic, electric, electrical, wave, circui
Cluster 5: Size: 134. Focus articles: nuclear physics; atomic nucleus; physic
    focus terms:particle, energy, electron, charge, nuclear, proton, radiation
Cluster 6: Size: 84. Focus articles: measurements; units, physical; electroma
    focus terms:unit, value, measure, numb, measurement, function, equal, obje
Cluster 7: Size: 187. Focus articles: space exploration; Space Shuttle; Soyuz
    focus terms:space, launch, fright, orbit, satellite, mission, rocket, eart
Cluster 8: Size 132. Focus articles: physics, history o; Einstein, Albert; g
    focus terms;theory, physic, light, physicist, motion, einstein, law, parti
Cluster 9: Size: 210. Focus articles: star; extragalactic syst; astronomy and
    focus terms:star, galaxy, light, year, sun, distance, mass, cluster, brigh
real time 37146 msec

```
> (time (setq fourth (outline third 7)))
cluster 187 items
global cluster 43 items . . .
cluster sizes 1 2 4 1 1 15 1 11 2 5
assign to nearest . . . done
cluster sizes 1 6 20 5 2 79 1 47 4 22
assign to nearest . . . done
cluster sizes 1 9 22 8 2 69 1 46 4 25
```
Cluster 0: Size: 1. Focus articles: Stealth
    focus terms:radar, bomber, aircraft, fly, stealth, shape, wing, replace, a
Cluster 1: Size: 9. Focus articles: Juno; von Braun, Wernher; Jupiter; soun
    focus terms:rocket,space, missile, research, jupiter, redstone, satellite
Cluster 2: Size: 22. Focus articles: rockets and missil; Atlas; Thor; Titan;
    focus terms:missile, rocket, launch, stage, kg, thrust, space, ballistic,
Cluster 3: Size: 8. Focus articles: helicopter; VTOL; flight; jet propulsio
    focus terms:flight, engine, air, aircraft, rotor, helicopter, lift, speed,
Cluster 4: Size: 2. Focus articles: STOL; C-5 Galaxy;
    focus terms:aircraft, wing, speed, lift, engine, air, takeoff, land, weigh
Cluster 5: Size: 69. Focus articles: space exploration Soyuz; Salyut; Volko
    focus terms:space, launch, soyuz, cosmonaut, soviet, flight, spacecraft, m
Cluster 6: Size: 1. Focus articles: railgun;
    focus terms:projectile, sec, accelerate, speed, space, test, launch, field
Cluster 7: Size: 46. Focus articles: Gordon, Richard F.; Stafford, Thomas P;
    focus terms:astronaut, apollo, pilot, space, lunar, mission, flight, moon,
Cluster 8: Size: 4. Focus articles: phobia; claustrophobia; agoraphobia; He -continued focus terms;space, fear, phobia, claustrophobia, canvas, person, agoraphob
Cluster 9: Size: 25. Focus articles: communications sat; GEOS; Vanguard; SYN
  focus terms:satellite, launch, orbit, space, earth, kg, communication, pro
real time 18251 msec Two relevant, yet distinct clusters emerge at this stage; namely 5 (Soviet Space Exploration) and 7 (U.S. Space Exploration). The contents of these clusters is exhaustively displayed as follows:

(print-titles (nth 5 fourth))

| | |
|---|---|
| 40 | Zond |
| 74 | Zholobov, Vitaly |
| 238 | Yelliseyev, Aleksei Stanislavovich |
| 239 | Yegorov, Boris B. |
| 921 | weightlessness |
| 1269 | Vostok |
| 1270 | Voskhod |
| 1286 | Volynov, Boris Valentinovich |
| 1306 | Volkov, Vladislav Nikolayevich |
| 1574 | Venera |
| 2345 | tracking station |
| 2522 | Titov, Gherman S. |
| 2881 | Tereshkova, Valentina |
| 3959 | Sputnik |
| 4120 | Spacelab |
| 4125 | space station |
| 4126 | Space Shuttle |
| 4127 | space medicine |
| 4128 | space law |
| 4129 | space exploration |
| 4131 | Soyuz |
| 4365 | SNAP |
| 4477 | Skylab |
| 4849 | Shatalov, Vladimir A. |
| 4943 | Sevastianov, Vitaly I. |
| 5465 | Sarafanov, Gennady Vasilievich |
| 5611 | Salyut |
| 5809 | Ryumin, Valery |
| 5893 | Rukavishnikov, Nikolay |
| 5928 | Rozhdestvensky, Valery |
| 6074 | Romanenko, Yury Viktorovich |
| 6457 | Remek, Vladimir |
| 6652 | Ranger |
| 7381 | Popovich, Pavel Romanovich |
| 8267 | Patsayev, Viktor |
| 9751 | National Aeronautics and Space Administration |
| 10915 | Mercury program |
| 11104 | McNair, Ronald |
| 11437 | Mars |
| 11729 | Makarov, Oleg |
| 12006 | Lyakhov, Vladimir |
| 12042 | Lunokhod |
| 12054 | Luna (spacecraft) |
| 12616 | Leonov, Aleksei |
| 12723 | Lebedev, Valentin |
| 12766 | Lazarev, V. G. |
| 13145 | Kubasov, Valery N. |
| 13243 | Komaraov, Vladimir |
| 13296 | Klimuk, P. I. |
| 13427 | Khrunov, Yevgeny |
| 13513 | Kennedy, Space Center |
| 13626 | Kapustin Yar (ka-poos- tin yahr) |
| 14072 | Jarvis, Gregory |
| 14224 | Ivanov, Georgy |
| 14226 | Ivanchenkov, Aleksandr |
| 16208 | Gubarev, Aleksei |
| 16439 | Grechko, Georgy Mikhailovich |
| 16665 | Gorbatko, Viktor V. |
| 16796 | Godard Space Flight Center |
| 16864 | Glazkov, Yury Nokolayevich |
| 18383 | Feoktistov, Konstantin P. |
| 19449 | Dzhanibekov, Vladimir |
| 19906 | Dobrovolsky, Georgy T. |
| 20266 | Demin, Lev Stepanovich |
| 23340 | Bykovsky, Valery |
| 25920 | astronautics |
| 26021 | Artyukhin, Y. P. |
| 26313 | Apollo-Soyuz Test Project |
| 27103 | Aksenov, Vladimir |

(print title (nth 5 fourth))

| | |
|---|---|
| 177 | Young, John W. |
| 403 | Worden, Alfred M. |
| 753 | White, Edward H., II |
| 903 | Weitz, Paul J. |
| 3391 | Surveyor |
| 3910 | Stafford, Thomas P. |
| 4460 | Slayton, D. K. |
| 4805 | Shepard, Alan B., Jr. |
| 5173 | Scott, David R. |
| 5211 | Schweickart, Russell L. |
| 5289 | Schirra, Walter M., Jr. |
| 6047 | Roosa, Stuart A. |
| 7519 | Pogue, William Reid |
| 10526 | Mitchell, Edgar D. |
| 11139 | McDivitt, James |
| 11245 | Mattingly, Thomas |
| 12050 | Lunar Rover |
| 12051 | Lunar Orbiter |
| 12052 | Lunar Excursion Module |
| 12148 | Lousma, Jack |
| 13897 | Johnson Space Center |
| 14297 | Irwin, James |
| 16026 | Haise, Fred W. |
| 16299 | Grissom, Virgil I. |
| 16651 | Gordon, Richard F., Jr. |
| 16998 | Gibson, Edward |
| 17189 | Gemini program |
| 17282 | Garriott, Owen |
| 18697 | Evans, Ronald |
| 19236 | Eisele, Donn F. |
| 19579 | Duke, Charles, Jr. |
| 20916 | Crippen, Robert |
| 21243 | Cooper, Leroy Gordon, Jr. |
| 21348 | Conrad, Pete |
| 21593 | Collins, Michael |
| 22479 | Chaffee, Roger |
| 22523 | Cernan, Eugene |
| 22826 | Carr, Gerald |
| 22835 | Carpenter, Scott |
| 23924 | Brand, Vance |
| 25140 | Bean, Alan |
| 25921 | astronaut |
| 26102 | Armstrong, Neil A. |
| 26314 | Apollo program |
| 26567 | Anders, William Alison |
| 26998 | Aldrin, Edwin E. |

The existence of two sets of relevant documents has been discovered with relatively disjoint vocabularies. At this stage individual documents may be examined, or some directed search tool might be applied to this restricted corpus. This example illustrates that the steps of determining a summary (with Cluster Digest), and providing a further ordering (with, for example, Buckshot) can be performed multiple times.

B. Procedures

For each document, $\alpha$, in a collection (or corpus), C, let a countfile $c(\alpha)$ be a set of words, with their frequencies, that occur in that document. Let V be a set of unique words occurring in C. Then $c(\alpha)$ can be represented as a vector of length $|V|$;

$$c(\alpha)_i = \begin{cases} 0 & \text{if } w_i \notin \alpha \\ f(w_i, \alpha) & \text{if } w_i \in \alpha \end{cases}$$

for $1 \leq i \leq |V|$, where $w_i$ is the ith word in V and $f(w_i, \alpha)$ is the frequency of $w_i$ in $\alpha$.

To measure the similarity between pairs of documents, $\alpha$ and $\beta$, let the cosine be employed between monotone element-wise functions of $c(\alpha)$ and $c(\beta)$. In particular, let $$s(\alpha, \beta) = \frac{<g(c(\alpha)), g(c(\beta))>}{||g(c(\alpha))|| \, ||g(c(\beta))||}$$

where g is a monotone damping function and "$<>$" denotes inner product. $g(x) = \sqrt{x}$ produces good results hence, $g(x) = \sqrt{x}$ is used in the current implementation. However, it is understood that other values of $g(x)$ could be used.

It is useful to consider similarity to be a function of document profiles, where $$p(\alpha) = \frac{g(c(\alpha))}{||g(c(\alpha))||},$$

in which case $$s(\alpha, \beta) = <p(\alpha), p(\beta)> = \sum_{i=1}^{|v|} p(\alpha)_i p(\beta)_i.$$

Suppose $\Gamma$ is a set of documents, or a document group. A profile can be associated with $\Gamma$ by defining it to be a normalized sum profile of contained individuals. Let $$\hat{p}(\Gamma) = \sum_{\alpha \in \Gamma} p(\alpha),$$

define an unnormalized sum profile, and $$p(\Gamma) = \frac{\hat{p}(\Gamma)}{||\hat{p}(\Gamma)||},$$

define a normalized sum profile. Similarly, the cosine measure can be extended to $\Gamma$ by employing this profile definition:

$$s(\Gamma, x) = <p(\Gamma), p(x)>.$$

B.1. Partitional Clustering

Partitional clustering presumes a parameter k which is the desired size of the resulting partition (number of subgroups). The general strategy is to: (1) find k centers, or seeds; (2) assign each document to one of these centers (for each $\alpha$ in C assign $\alpha$ to the nearest center); and (3) possibly refine the partition, either through iteration or some other procedure. The result is a set P of k disjoint document groups such that $\cup_{\epsilon P} = C$.

The Buckshot method uses random sampling followed by truncated agglomerative clustering to find the k centers. Its refinement procedure is simply an iteration of assigning each document to a k center where new centers are determined from a previous partition P.

The Fractionation method uses successive stages of truncated agglomerative clustering over fixed sized groups to find the k centers. Refinement is achieved through repeated application of procedures that attempt to split, join and clarify elements of the partition P.

The Buckshot method sacrifices some precision (in the sense of document misclassification) in favor of speed, while Fractionation attempts to find a very high precision partition through exhaustive refinement. Buckshot is appropriate for the on-the-fly online reclustering required by inner iterations of Scatter-Gather, while Fractionation can be used, for example, to establish the primary partitioning of the entire corpus, which is displayed in the first iteration of Scatter-Gather.

B.2. Buckshot

The Buckshot method employs three subprocedures. The first subprocedure, truncated group average agglomerate clustering, merges disjoint document sets, or groups, starting with individuals until only k groups remain. At each step the two groups whose merger would produce the least decrease in average similarity are merged into a single new group. The second subprocedure determines a trimmed sum profile from selected documents closest to a document group centroid. The third subprocedure assigns individual documents to the closest center represented by one of these trimmed sum profiles.

For truncated group average agglomeration, let $\Gamma$ be a document group, then the average similarity between any two documents in $\Gamma$ is defined to be:

$$S(\Gamma) = \frac{2}{|\Gamma|(1 - |\Gamma|)} \sum_{\alpha \in \Gamma} \sum_{\beta \in \Gamma} s(\alpha, \beta).$$

Let G be a set of disjoint document groups. The basic iteration of group average agglomerative clustering finds the pair $\Gamma'$ and $\Delta'$ such that:

$$S(\Gamma' \cup \Delta') = \max_{\Gamma \in G} (\max_{\Delta \neq \Gamma} S(\Gamma \cup \Delta)).$$

A new, smaller, partition $G'$ is then constructed by merging $\Gamma'$ with $\Delta'$.

$$G' = (G - \{\Gamma', \Delta'\}) \cup \{\Gamma' \cup \Delta'\}.$$

Initially, G is simply a set of singleton groups, one for each individual to be clustered. The iteration terminates (or truncates) when $|G'| = k$. Note that the output from this procedure is the final flat partition $G'$, rather than a nested hierarchy of partitions, although the latter could be determined by recording each pairwise join as one level in a dendrogram.

If the cosine similarity measure is employed, the inner maximization can be significantly accelerated. Recall that $\hat{p}(\Gamma)$ is the unnormalized sum profile associated with $\Gamma$. Then the average pairwise similarity, $S(\Gamma)$, is simply related to the inner product, $<\hat{p}(\Gamma),\hat{p}(\Gamma)>$. That is, since:

$$<\hat{p}(\Gamma),\hat{p}(\Gamma)> = \sum_{\alpha\in\Gamma}\sum_{\beta\in\Gamma} <p(\alpha),p(\beta)>$$

$$= |\Gamma|(|\Gamma| - 1)S(\Gamma) + \sum_{\alpha\in\Gamma} <p(\alpha),p(\alpha)>$$

$$= |\Gamma|(|\Gamma| - 1)S(\Gamma) + \Sigma<p(\alpha),p(\alpha)>$$

$$S(\Gamma) = \frac{<\hat{p}(\Gamma),\hat{p}(\Gamma)> - |\Gamma|}{|\Gamma|(|\Gamma| - 1)}.$$

Similarly, for the union of two disjoint groups, $\Lambda = \Gamma \cup \Delta$ $$S(\Lambda) = \frac{<\hat{p}(\Lambda),\hat{p}(\Lambda)> (|\Gamma| + |\Delta|)}{(|\Gamma| + |\Delta|)((|\Gamma| + |\Delta|) - 1)}$$

where, $$<\hat{p}(\Lambda),\hat{p}(\Lambda)> = <\hat{p}(\Gamma),\hat{p}(\Gamma)> + 2<\hat{p}(\Gamma),\hat{p}(\Delta)> + <\hat{p}(\Delta),\hat{p}(\Delta)>$$

Therefore, if for every $\Gamma \in G$, $S(\Gamma)$ and $\hat{p}(\Gamma)$ are known, the pairwise merge that will produce the greatest average similarity can be cheaply determined by determining one inner product for each candidate pair. Further, suppose for every $\Gamma \in G$ the $\Delta$ were known such that:

$$S(\Gamma \cap \Delta) = \max_{\Delta \neq \Gamma} S(\Gamma \cup \Delta),$$

then finding the best pair would simply involve scanning the $|G|$ candidates. Updating these quantities with each iteration is straight forward, since only those involving $\Gamma'$ and $\Delta'$ need be redetermined.

Using techniques such as those described above, it can be seen that the average time complexity for truncated group average agglomerative clustering is $O(N^2)$, i.e., proportional to $N^2$, where N is equal to the number of individuals to be clustered.

B.2.a. Trimmed Sum Profiles

For trimmed sum profiles, given a set of k document groups that are to be treated as k centers for the purpose of attracting other documents, it is necessary to define a centroid, or attractor, for each group $\Gamma$. One simple definition would just consider the normalized sum profile for each group, $p(\Gamma)$. However, better results are achieved by trimming out documents far from this centroid.

For every $\alpha$ in $\Gamma$ let $r(\alpha,\Gamma)$ be the rank of $<p(\alpha),p(\Gamma)>$ in the set $\{<p(\beta),p(\Gamma)>:\beta\in\Gamma\}$. If $r(\alpha,\Gamma)=1$ then $<p(\alpha),p(\Gamma)>$ is the largest similarity in the set. Then define:

$$\hat{p}_m(\Gamma) = \sum_{\alpha \ni r(\alpha,\Gamma)\leq m} p(\alpha).$$

and $$p_m(\Gamma) = \hat{p}_m(\Gamma)/\|\hat{p}(\Gamma)\|.$$

This determination can be carried out in time proportional to $|\Gamma| \log |\Gamma|$.

Essentially, $p_m(\Gamma)$ is the normalized sum of the m nearest neighbors in $\Gamma$ to $p(\Gamma)$. The trimming parameter m may be defined adaptively as some percentage of $|\Gamma|$, or may be fixed. For example, in one implementation m=20.

The trimming of far away documents in determining the centroid profile leads to better focussed centers, and hence to more accurate assignment of individual documents in Assign-to-Nearest.

B.2.b. Assign to Nearest

For assign-to-nearest, once k centers have been found, and suitable profiles defined for those centers, each document in C must be assigned to one of those centers based on some criterion. The simplest criterion assigns each document to the closest center.

Let G be a partition of k groups, and let $\Gamma_i$ be the ith group in G. Let:

$$\Pi_i = \left\{ \alpha \in C: <\alpha, p_m(\Gamma_i)> = \max_{j=0}^{k} <\alpha, p_m(\Gamma_j)> \right\}.$$

Ties can be broken by assigning $\alpha$ to the group with lowest index. $P = \{\Pi_i\}$, $0 \leq i \leq k$ is then the desired assign-to-nearest partition.

P can be efficiently determined by constructing an inverted map for the k centers $p_m(\Gamma_j)$, and for each $\alpha \in C$ simultaneously determining the similarity to all the centers. In any case, the cost of this procedure is proportional to kN, where $N = |C|$.

B.2.c Buckshot Procedure

FIG. 6 is a flowchart of a preferred embodiment of a Buckshot method for providing a further ordering of a corpus of documents in the Scatter-Gather method as shown in step 18 of FIG. 2. The Buckshot fast clustering method takes as input a corpus, C, an integer parameter k, $0 < k \leq |C|$, and produces a partition of C into k groups. Let $N = |C|$. The steps of the Buckshot method include:

1. Construct a random sample C' from C of size $\sqrt{kN}$, sampling without replacement (step 130).
2. Partition C' into k groups by truncated group average agglomerative clustering (step 132). Call this partition G.
3. Construct a partition P of C by assigning each individual $\alpha$ to one of the centers in G (step 134). This is accomplished by applying assign-to-nearest over the corpus C and the k centers G.
4. Replace G with P (step 136) and repeat steps 3 and 4 once.
5. Return the new corpus partition P (step 138).

Since random sampling is employed in the definition of C', the Buckshot method is not deterministic. That is, repeated calls to this procedure on the same corpus may well produce different partitions; although repeated calls generally produce qualitatively similar partitions. It is easy to see that, if the C is actually composed of k well separated clusters, then as N increases, one is essentially assured of sampling at least one candidate from each cluster. Hence, asymptotically Buckshot will reliably find these k clusters.

Step 1 could be replaced by a more careful deterministic procedure, but at additional cost. In the contemplated application, Scatter-Gather, it is more important that the partition P be determined at high speed than that the partitioning procedure be deterministic. Indeed, the lack of determination might be interpreted as a feature, since the user then has the option of discarding an unrevealing partition in favor of a fresh reclustering.

Step 4 is a refinement procedure which iterates assign-to-nearest once. Further iterations are of course possible, but with diminishing return. Since minimizing determine time is a high priority, one iteration of assign-to-nearest is a good compromise between accuracy and speed.

Steps 2, 3 and 4 all have time complexity proportional to kN. Hence the overall complexity of Buckshot is O(kN).

B.3 Cluster Digest

FIG. 5 is a flowchart of a preferred embodiment of a Cluster Digest method for determining a summary of an initial ordering of a corpus of documents in the Scatter-Gather document partitioning method as shown in step 17 of FIG. 2. For Cluster Digest, given a partition P, it is useful for diagnostic and display purposes to have some procedure for summarizing the individual document groups, or clusters, contained in P. One simple summary is simply an exhaustive list of titles, one for each document in    . However, such a summary grows linearly with group size and hence, is of limited use for large clusters. For Scatter-Gather, it is desirable for the summary to be constant size, so a fixed number of summaries can be reliably fit onto a given display area. Thus, in step 120, a summary of constant size is provided, and in step 122, a fixed number of "topical" words plus the document titles of a few "typical" documents are listed. Here "topical" words are those that occur often in the cluster and "typical" documents are those close to the cluster centroid (or trimmed centroid). This summary is referred to as a Cluster Digest.

Cluster Digest takes as input a document group    , and two parameters, $\omega$, which determines the number of topical words output and d, which determines the number of typical documents found. The list of topical words is generated by sorting p($\Gamma$) (or $p_m(\Gamma)$) by term weight and selecting the $\omega$ highest weighted terms. The list of typical documents is generated by selecting the d documents closest to p($\Gamma$), $\{\alpha \epsilon \Gamma : r(\alpha,\Gamma) \leq d\}$.

In one example, $\omega = 10$ and $d = 3$.

B.4 Fractionation

B.4.a. Overview and Supporting Material

Fractionation involves the development of an efficient and accurate document partitioning procedure which provides a number of desirable properties. The Fractionation procedure partitions a corpus into a predetermined number of "document groups". It operates in time proportional to the number of documents in the target corpus, thus distinguishing from conventional hierarchical clustering techniques which are intrinsically quadratictime. Although non-hierarchical in nature by producing a partition of the corpus rather than a tree, the Fractionation method can be applied recursively to generate a hierarchical structure if desired. New documents can be incorporated in time proportional to the number of buckets in an existing partition, providing desirable utility for dynamically changing corpora. Also, the resulting partitions are qualitatively interesting, that is, with few exceptions buckets can be interpreted as topic coherent. Finally, the similarity measure at the base of the procedure depends only on term frequency considerations, and hence should be applicable over all natural languages that contain a lexical analysis capability.

First, a document corpus is divided into a number of buckets, each of a given fixed size. This initial division can be done at random or by making use of document similarity based on word overlap to induce an ordering over the corpus that places together documents likely to be similar. These fixed size buckets are individually clustered using a standard agglomerative procedure. However, a stopping rule removes agglomerations from consideration once they achieve a given size, for example, 5. Agglomerative clustering terminates when the ratio of current output agglomerations to original inputs falls below a given threshold, the reduction factor currently being, for example, 0.25. The outputs are collected and rearranged into fewer new buckets of the same fixed size where groups of documents, rather than individuals, are counted as employed in the initial division, and the output collection and rearranging process is reiterated. This stage of the Fractionation procedure completes when the total number of outputs from a given iteration is close to the desired number of partitions.

Although the basic building block of the procedure is agglomerative clustering, it is always applied to groups of a given fixed size. Each iteration can be thought of as producing, in a bottom-up fashion, one level of an n-ary branching tree where the branching factor is the reciprocal of the given reduction factor. Hence, agglomerative clustering is applied as many times as there are internal nodes of a tree. Since this number is proportional to the number of terminal nodes, the cost of the procedure is proportional to the cost of each agglomerative procedure times the number of terminal nodes. Thus, if n is the given fixed size, $(n^2)(N/n) = nN$.

Therefore, this stage of the Fractionation procedure is linear in N for a fixed desired number of partitions.

In the agglomerative process, not every pairwise distance between agglomerations is considered, instead, reasonably well behaved subcorpora are separately clustered with the expectation that the seeds of global clusters will be formed within each subcorpus. The scope of the determination expands as it proceeds upwards, so that strong trends may be reinforced and weak ones subsumed. The final result is a partition of the original corpus into buckets where the content of each bucket is presumed to reflect the global trend. These buckets are expected to be noisy, in the sense that they may overlap in content, represent excessive merges, or contain documents better placed elsewhere. To repair these deficiencies, the initial partitioning is refined in iterative fashion.

A number of different refinement procedures can be devised which would improve the initial partitioning. Refinement methods which do not increase the linear order of the overall procedure can be accomplished by analysis of nearest neighbor patterns between individual documents of a given partitioning. It is desirable for the refinement efforts to be cumulative in the sense that they may be applied sequentially and in combination. Refinement methods can be used to merge, split and disperse buckets. Furthermore, application of a predetermined number of refinement methods does not change the linear order of the overall document procedure.

In contrast to standard hierarchical techniques, Fractionation can be easily adapted to incrementally update and dynamically change the partition of a given corpus. One simple strategy is to add new documents to the closest matching bucket of an existing partition. Refinement processes would run at regular intervals which could introduce new buckets if necessary by splitting old ones or merging buckets as distinctions become less clear. Also, although the resulting partition is not a hierarchical structure, it can be made so if desired, by recursive application of Fractionation to the subcorpora defined by single buckets.

Some particularly distinctive characteristics of Fractionation, as compared to other document partitioning procedures, include:

(1) Intermediate score. Rather than using word occurrence frequencies as a basis for document similarity, an intermediate score between the document and presence or absence in representation of document profiles is used. In particular, good performance is provided using square roots of counts within documents when summing the square roots across agglomerations. This allows putting about five documents or agglomerations together in a single step.

(2) Stepwise assembly. Preliminary buckets greater than or equal to five documents are not combined with single documents. Rather, stages of combining documents by five are iterated until the desired number of final buckets has been reached.

(3) Recurrent trimming. Documents which are not included in the initial preliminary bucketing into groups of greater than or equal to five documents are excluded from further procedures until the final iteration. At that time, the documents are assigned to the closet final bucket.

(4) Repeated improvement. Improvements are implemented through procedures such as repeated alternations of split and merge operations.

(5) No reliance on natural boundaries. Documents are partitioned according to internal coherence and reasonable distinctiveness, rather than by any comparison with predetermined boundaries.

B.4.b. The Fractionation Procedure

Figure 4:
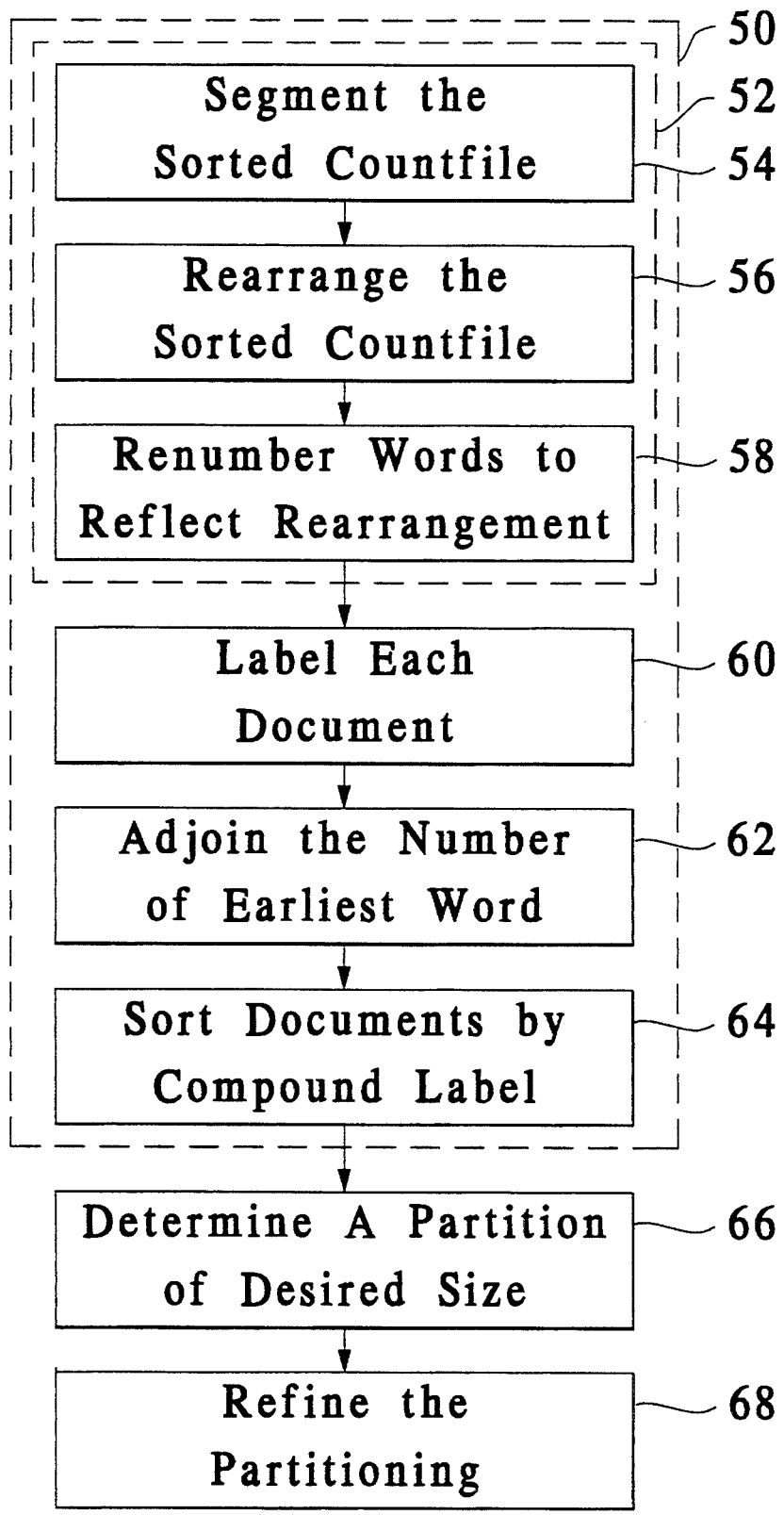
FIG. 4 is an intermediate level flowchart of a first embodiment of a Fractionation initial partitioning method of the present invention for preparing an initial ordering of a corpus of documents as used in the Scatter-Gather document browsing method.

The overall procedure for Fractionation when starting with a new corpus, falls naturally into three stages, shown in FIG. 4:

Preparing an initial ordering of the corpus (step 50);

Determining a partitioning of the desired size from the initial ordering (step 66); and Improving the partitioning by refinement (step 68).

Linear time is sustained because quadratic-time operations are restricted to subcorpora whose size does not grow with the size of the corpus.

Simple agglomeration applied to a large corpus is quadratic in the number of individuals. If it were possible to produce a reasonable initial partitioning of some given size in time proportional to the number of individuals, the application of any fixed number of refinement processes would not increase the order of the overall procedure. Further, if not initially then through refinement, the final result can be a good (internally coherent) partitioning of the corpus.

Since the basic tool for agglomeration is group average agglomerative clustering, it must be applied in a way that does not consider all pairwise similarities, or even a number proportional to all pairwise similarities. For a constant n which is similar to the desired size of the final partitioning, a corpus of N can be divided into groups of size n. Truncated agglomerative clustering may be applied to each group in time proportional to $n^2$. Since there about N/n groups, the total time for this step is proportional to $(N/n)n^2 = Nn$.

Simple agglomerative clustering may be elaborated by supplying alternative stopping rules. These come in two types: conditions which limit the growth of any one agglomeration and conditions which terminate the overall process before a single over-arching agglomeration is formed. A condition of the first type states that if an agglomeration grows to size k, then it is removed from consideration in any further agglomeration steps. A condition of the second type terminates the iteration if the total set of agglomerations currently under consideration represents no more than r% of the size of the original corpus. Let k be the "stop" parameter and r be the "reduction" parameter.

Suppose two constants b and k are chosen, and agglomerative clustering is applied with reduction 1/b. That is, agglomeration stops as soon as fewer than n/b objects remain. After one step, the N/b outputs can be treated as individuals and iterated. This will take nN/b time. Thus the total time involving agglomerative clustering will be $$nN(1 + b + b^2 \ldots) = \frac{b}{b-1} nN$$

which is rectangular in n and N. This process will be described as a center finding procedure, since it has frequently been used with $k=5$ and $r=0.25$, and may be viewed as a bottom-up construction of a 1/r branching tree.

The refinement procedures, to be discussed herein as well as the assign-to-nearest procedure and the multiple use of agglomerative clustering are all rectangular in the size of the number of individuals and either the number of buckets in the partitioning, or the size of the initial groups, n, which was chosen to approximate the size of the final partitioning.

FIG. 4 is a flowchart of one preferred embodiment of the Fractionation Method described herein which can be employed as the step of initializing a partition of a corpus of documents or preparing an initial ordering 16 as shown in FIG. 2.

Fractionation can be thought of as a more careful version of Buckshot that trades speed for increased accuracy. In particular, steps 1 and 2 of Buckshot are replaced by a deterministic center finding procedure, and step 4 is elaborated with additional refinement iterations and procedures. Since the refinement procedures have the capability to merge, split and destroy clusters, Fractionation may not produce exactly k document groups. In other words, Fractionation is an adaptive clustering method.

The center finding procedure finds k centers by initially breaking C into N/m buckets of a fixed size m. The individuals in these buckets are then separately agglomerated into document groups such that the reduction in number (from individuals to groups in each bucket) is roughly $\rho$. These groups are now treated as if they were individuals, and the entire process is repeated. The iteration terminates when only k groups remain. The center finding procedure can be viewed as building a $1/p$ branching tree bottom up, where the leaves are individual documents, terminating when only k roots remain.

Suppose the individuals in C are enumerated, so that $C=\alpha_1,\alpha_2,---,\alpha_N$. This ordering could reflect an extrinsic ordering on C, but a better procedure sorts C based on a key which is the word index of the Kth most common word in each individual, where $1 \leq K < |V|$. Typically K is a smaller number, such as three, which favors medium frequency terms. This procedure thus encourages that nearby individuals in the corpus ordering have at least one word in common.

Group selection that provides relatively weak similarity of documents grouped together or placed in adjacent groups, will enhance the quality of the step-by-step bucketing of these groups. Thus, it is worthwhile to do some structuring (initial ordering) of the corpus into groups of adjacent elements of size n. One example of such an initial ordering process (box 50, FIG. 4) is based upon word similarity, and is described as follows:

Initial ordering

Input C, a corpus
1. Sort words (stem types) by entries in corpus countfile, most frequent first (Step 52).
    1.1 Segment the sorted countfile (Step 54) according to frequency$>c$ (segment c), $c>$frequency$\geq d$ (segment d), and frequency$\leq d$ (segment e).
    1.2 Rearrange countifle (Step 56) in order segment d, then segment c, then segment e.
    1.3 Renumber words, (Step 58) to reflect this reordering.
2. Label (Step 60) each document by the number of the earliest word in the sorted file which appears in it.
3. Adjoin (Step 62) to this number the number of the first word (in text order) in the document.
4. Sort documents (Step 64) by the compound label (earliest in countfile, earliest in document).

The various steps take times of the following orders: Step 1 takes $|V|\log|V|$; step 2 takes $|C|$ time (multiplied by the average length of a documents profile); step 3 takes $|C|$ time; step 4 takes $|C|\log|C|$ time. Step 1.1 takes $|V|$ time, all of 1.1 to 1.2 are bounded by the total vocabulary size, and grow only slowly and boundedly as $|C|$ grows.

The center finding procedure builds an initial partitioning of a corpus C by first applying the structuring process to construct a crude grouping into groups of size n and then applying agglomerative clustering as previously described.

The initial bucketing creates a partition $B=\{\Theta_1, \Theta_2, \ldots, \Theta_{N/m}\}$:

$$\Theta_i=\{\alpha_{m(i-1)+1},\alpha_{m(i-1)+2},\ldots,\alpha_{mi}\}$$

The document groups $\Theta_i$ are then separately clustered using an agglomerative procedure, such as truncated group average agglomerative clustering, with $k=\rho m$, where $\rho$ is the desired reduction factor. Note that each of these determinations occurs in $m^2$ time and hence, all N/m occur in Nm time. Each application of agglomerative clustering produces an associated partition $R_i=\{\Phi_{i,1},\Phi_{1,2},\ldots,\Phi_{i,\rho m}\}$. The union of the documents groups contained in these partitions are then treated as individuals for the next iteration. That is, define $$C'=\{\Phi_{i,j};1\leq i\leq N/m,\ 1\leq j\leq \rho m\}.$$

C' inherits an enumeration order by defining $$\Phi_{i,j}=\alpha'_{N/m(i-1)+j}.$$

The process is then repeated with C' instead of C. That is, the $\rho N$ components of C' are broken into $\rho N/m$ buckets, which are further reduced to $\rho^2 N$ groups that separate agglomeration. The process terminates at iteration j if $\rho^j N < k$. At this point one final application of agglomerative clustering can reduce the remaining groups to a partition P of size k (Step 66), for instance with $m=200$ and $\rho=\frac{1}{4}$.

The Fractionation refinement procedure (Step 68) performs a fixed number of iterations of a cycle of three separate operators. The first operator, Split, generates a new partition by dividing each document group in an existing partition into two parts. The second operator, Join, merges document groups that are indistinguishable from the point of view of Cluster Digest. The third operator is some number of iterations of Assign-to-Nearest, followed by the elimination of groups smaller than some threshold.

For every document group $\Gamma$ in a partition P, the Split operator divides $\Gamma$ into two new groups. This can be accomplished by applying Buckshot clustering with $C=\Gamma$ and $k=2$. The resulting Buckshot partition G provides the two new groups.

Let $P=\{\Gamma_1,\Gamma_2,\ldots,\Gamma_k\}$ and let $G_i=\{\Gamma_{i,1},\Gamma_{i,2}\}$ be a two element Buckshot partition of $\Gamma_i$. The new partition P' is simply the union of the $G_i$'s:

$$P' = \bigcup_{i=j}^{k} G_i.$$

Note that $|P'|=2k$. Each application of Buckshot requires time proportional to $2|\Gamma_i|$. Hence, the overall determination can be performed in time proportional to 2N.

A modification of this procedure would only split groups that score poorly on some coherency criterion. One simple coherency criterion is simply the average similarity to the cluster centroid:

$$A(\Gamma) = \frac{1}{|\Gamma|} \sum_{\alpha \in \Gamma} s(\alpha,\Gamma).$$

Let $r(\Gamma_i,P)$ be the rank of $A(\Gamma_i)$ in the set $\{A(\Gamma_1),A(\Gamma_2),\ldots,A(\Gamma_k)\}$. This procedure would then only split groups such that $r(\Gamma,P)<pk$ for some p, $0<p<1$. This modification does not change the order of the procedure since the coherence criterion can be determined in time proportional to N.

The purpose of the Join refinement operator is to merge document groups in a partition P that would be difficult to distinguish if they were summarized by Cluster Digest. Since by definition any two elements of P are disjoint, they will never have "typical" documents in common. However, their lists of "topical" words may well overlap. Therefore the criterion of distinguishability between two groups $\Gamma$ and $\Delta$ will be:

$$T(\Gamma,\Delta)=|t(\Gamma)\cap t(\Delta)|$$

where $t(\Gamma)$ is the list of topical words for $\Gamma$ generated by the Cluster Digest summary.

Let $\Gamma$ be related to $\Delta$ if $T(\Gamma,\Delta)>p$, for some p, $0<p\leq w$. Let $\Re$ be the transitive closure of this relation. That is, $\Re(\Gamma,\Delta)$ if there exists a sequence of groups $(\Lambda_1,\Lambda_2, \ldots ,\Lambda_m)$ such that $T(\Gamma,\Lambda_1)>p, T(\Lambda_i,\Lambda_{i+1})>p$ for $1\leq i<m$, and $T(\Lambda_m,\Delta)>p$. Since $\Re$ is an equivalence relation, a new partition P' is generated by $\Re$. This partition is returned as the result of Join.

The determination of the transitive closure requires time proportional to $k^2$; hence the time complexity of Join is $O(k^2)$.

In one illustrative implementation $w=10$ and $p=6$.

The inputs of refinement are an existing partition P, a parameter I which determines the number of Split, Join, Assign-to-Nearest cycles executed, a parameter M which determines the number of Assign-to-Nearest iterations in each cycle, and a threshold T which is the minimum allowable document group size. A typical sequence of refinement steps follows:

Do I times
1 Split P to form P'
2 Join P' to form P"
3 Do M times
   3.1 Apply Assign-to-Nearest to P" to form G.
   3.2 Eliminate $\Gamma$ in G if $|\Gamma|<T$ to form G'
   3.3 Let P"=G'
4 Return P"

The Elimination operator of Step 3.2 is implemented by supplying Assigning-to-Nearest with $C=\Gamma$ and merging the resulting partition into G.

Steps 1, and 3.1 require time proportional to N, Step 2 requires time proportional to $k^2$, and step 3.2 requires time proportional to the number of individuals assigned to nearest, which is always less than N. Therefore, assuming $k^2<N$, which is typically the case, the overall time complexity of refinement is $O(N)$.

In the illustrative implementation $I=3$, $M=3$ and $T=10$.

Fractionation takes as input a corpus C, and a parameter k, the desired number of clusters.

C. Summary

The Fractionation method as summarized includes the following steps:

1 Apply center finding to Construct an initial partition P
2 Apply Assign-to-Nearest with G=P to form P'
3 Apply Refinement to form P"
4 Return P" as the final partition of C Note that, due to refinement, the size of the returned partition may not be equal to k.

In contrast to Buckshot, Fractionation is a deterministic procedure which returns the same partition if repeatedly called with the same values for C and k.

Step 1 is $O(mN)$; step 2 $O(kn)$; and step 3 $O(N)$. Therefore assuming $k<m$, the overall time complexity of Fractionation is $O(mN)$.

Scatter-Gather is an interactive browsing tool, and hence is better thought of as a collection of operators, rather than as a method that determines a particular quantity. It is presumed that a fixed corpus of interest, C, has been identified, and that the user is seated at a display (monitor 8) from which commands can be issued (via input device 9) to perform the next step. Since C is fixed, it is presumed that an initial partition can be determined off-line by application of the Fractionation clustering method. Fractionation is employed rather than Buckshot, since time is less of an issue for an off-line determination; hence time can be traded for accuracy. However, as noted in the earlier example, the initial ordering could be performed by Buckshot.

At start, this initial partition is presented to the user (via monitor 8 or printer 10) by applying Cluster Digest to each of the k document groups in order to determine a partition of a desired size as shown in step 17 of FIG. 2. Since Cluster Digest determines only two quantities of interest, a short list of typical document titles, and a short list of topical words, the presentation of each document group need not occupy more than a few lines of the display. In particular, it should be possible to present the entire partition in such a way that scrolling is not necessary to view all the summaries.

The operators available to the user are Pick, Recluster, Display and Backup. Given an existing partition, the Pick operation allows the user to select one or more document groups to form a new, reduced, subcorpus. The Recluster operator applies Buckshot to the current reduced subcorpus, defined by the last application of Pick. The Display operator presents the current partition by repeated application of Cluster Digest. The Backup operator replaces the current subcorpus with the subcorpus defined by the second most recent application of Pick.

A typical session iteratively applies a cycle of Pick, Recluster, and Display until the user comes across document groups of interest small enough for exhaustive display, or switches to the use of a directed search tool based on a term uncovered in the browsing process. A false Pick step can be undone by application of Backup.

While the present invention has been described with reference to particular preferred embodiments, the invention is not limited to the specific examples given and other embodiments and modifications can be made by those skilled in the art without departing from the spirit and scope of the invention.

What is claimed is:

1. A document browsing method in a digital computer for a corpus of documents, comprising the steps of:

preparing an initial ordering of the corpus into a first plurality of clusters by using a first method that automatically performs the initial ordering without external inputs based on contents of the documents using the digital computer;

determining a summary for each cluster of the first plurality of clusters prepared by said initial ordering of the corpus;

selecting by a user at least one cluster of the first plurality of clusters based on the summary of each cluster; and automatically providing a further ordering of the user selected at least one cluster into a second plurality of clusters by automatically analyzing contents of documents of the selected at least one cluster using a second method comprising the steps of:

grouping together all of the documents from the selected at least one cluster based on the content of each document, and then assigning each of the documents to one cluster of the second plurality of clusters.

2. The method of claim 1, wherein the preparing step includes a Fractionation method for partitioning the corpus of documents, said Fractionation method comprising the steps of:

preparing an ordering of the corpus;
determining a partitioning of a desired size from the ordering; and
refining the partitioning.

3. The method of claim 2, wherein the preparing an ordering step includes:
sorting words in order of frequency, most frequent word first, by entry into a corpus countfile;
labeling each document by a number of an earliest word in a sorted corpus countfile;
adjoining the number of an earliest word in a sorted corpus countfile to a number of a first text-ordered word in the document to form a compound label; and
sorting documents by the compound label.

4. The method of claim 3, wherein the sorting words step further comprises:
segmenting the sorted corpus countfile according to frequency into a number of segments;
rearranging the sorted corpus countfile according to segments; and
renumbering words to reflect the rearranging.

5. The method of claim 2, wherein the determining a partition step comprises truncated group averaging agglomerative clustering which includes limiting a growth of an agglomeration by terminating a group averaging agglomerative clustering before a single over-arching agglomeration is formed.

6. The method of claim 2, wherein the refining step includes refining with a assign-to-nearest method for assigning a document to a nearest bucket.

7. The method of claim 2, wherein the refining step includes merging similar buckets.

8. The method of claim 2, wherein the refining step includes splitting non-similar buckets.

9. The method of claim 2, wherein the refining step includes detecting at least one of weak similarity and small buckets and incoherent buckets by applying size and average similarity thresholds.

10. The document partitioning method of claim 1, wherein the determining a summary step includes determining a summary using a Cluster Digest method, said Cluster Digest method comprising the steps of:
providing a summary of constant size for each cluster; and
listing a fixed number of topical words plus document titles of a few typical documents within each cluster, wherein the topical words are words that occur often in the cluster and typical documents are documents close to a cluster centroid.

11. The document partitioning method of claim 10, wherein the providing a further ordering step includes providing a further ordering using a Buckshot method, said Buckshot method comprising the steps of:
constructing a random sample from the corpus of documents of size $\sqrt{kN}$ where k is an integer number of desired clusters and N is a number of documents in the corpus of documents;
partitioning into a partition G a random sample into k groups using truncated group average agglomerative clustering;
constructing a partition P of the corpus of documents by assigning each document to a k center in partition G and applying an assign-to-nearest procedure over the corpus and the k centers in partition G;
replacing partition G with partition P and repeating the step of constructing a partition; and
returning a new partition P.

12. The document partitioning method of claim 1, wherein the providing a further ordering step includes providing a further ordering step using a Buckshot method, said Buckshot method comprising the steps of:
constructing a random sample from the corpus of documents of size $\sqrt{kN}$ where k is an integer k number of desired clusters and N is a number of documents in the corpus of documents;
partitioning into a partition G a random sample into k groups using truncated group average agglomerative clustering;
constructing a partition P of the corpus of documents by assigning each document to a k center in partition G and applying assign-to-nearest over the corpus and the k centers in partition G;
replacing partition G with partition P and repeating the step of constructing a partition; and
returning a new partition P.

13. The document browsing method of claim 1, wherein the first method for preparing an initial ordering of the corpus is the same as the second method for providing a further ordering of a portion of the corpus.

14. A document browsing system for use with a corpus of documents in a digital computer, the document browsing system comprising:
preparing means for preparing without external inputs an initial ordering of the corpus into a first plurality of document clusters using the digital computer;
determining means for determining a summary for each cluster of the first plurality of document clusters prepared by said preparing means;
selecting means for a user to select at least one of the first plurality of document clusters; and
ordering means for automatically ordering the selected at least one of the first plurality of document clusters into a second plurality of clusters by
analyzing contents of documents of the selected at least one of the first plurality of document clusters,
grouping together all of the documents from the selected at least one of the first plurality of document clusters based on the contents of the documents of the selected at least one of the first plurality of document clusters, and then
assigning each of the documents to one cluster of the second plurality of clusters.

15. A document partitioning Fractionation method in a digital computer for non-hierarchical, linear-time partitioning of a corpus of documents, said Fractionation method comprising the steps of:
preparing an ordering of the corpus by
sorting words in order of frequency, most frequent word first, by entry into a corpus countfile,
labeling each document by a number of an earliest word in a sorted corpus countfile,
adjoining the number of an earliest word in a sorted corpus countfile to a number of a first text-ordered word in the document to form a compound label, and
sorting documents by the compound label;
determining a partitioning of a desired size from the ordering to form a set of buckets, each document of the corpus of documents assigned to only one bucket of the set of buckets; and
refining the partitioning by a predetermined number of iterations of creating a the set of modified buckets from the set of buckets based on contents and size of each bucket reassigning each document of the corpus of documents to the set of modified buckets.

16. The Fractionation method of claim 14, wherein the sorting words step further comprises:
   segmenting the sorted corpus countfile according to frequency into a number of segments;
   rearranging the sorted corpus countfile according to segments; and
   renumbering words to reflect the rearranging.

17. The Fractionation method of claim 14, wherein the determining step comprises truncated group averaging agglomerative clustering which includes limiting a growth of an agglomeration by terminating a group averaging agglomerative clustering before a single over-arching agglomeration is formed.

18. The Fractionation method of claim 14, wherein the refining step includes refining with a assign-to-nearest method for assigning a document to a nearest bucket.

19. The Fractionation method of claim 14, wherein the refining step includes merging similar buckets.

20. The Fractionation method of claim 14, wherein the refining step includes splitting non-similar buckets.

21. The method of claim 14, wherein the refining step includes detecting at least one of weak similarity and small buckets and incoherent buckets by applying size and average similarity thresholds.

* * * * *